(12) United States Patent
Das et al.

(10) Patent No.: US 6,743,383 B2
(45) Date of Patent: Jun. 1, 2004

(54) PROCESS FOR THE PRODUCTION OF CERAMIC TILES

(75) Inventors: Swapan Kumar Das, West Bengal (IN); Karun Kant Singh, Bihar (IN); Sanjay Kumar, Bihar (IN); Uma Sunker Das, Bihar (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/113,218

(22) Filed: Mar. 28, 2002

(65) Prior Publication Data

US 2003/0183988 A1 Oct. 2, 2003

(51) Int. Cl.$^7$ ............................................. B29B 17/00
(52) U.S. Cl. .................... 264/37.18; 264/37.1; 264/643; 264/660
(58) Field of Search ............................. 264/37.1, 37.18, 264/643, 660

(56) References Cited

U.S. PATENT DOCUMENTS

| | | | |
|---|---|---|---|
| 4,299,632 A | | 11/1981 | Gosin |
| 5,558,690 A | | 9/1996 | Hnat et al. ............... 65/134.8 |
| 5,603,758 A | * | 2/1997 | Schreifels, Jr. et al. ..... 106/677 |
| 5,830,251 A | | 11/1998 | Simpson et al. ............ 65/17.3 |
| 5,935,885 A | | 8/1999 | Hnat et al. ................. 501/1 |
| 6,340,650 B1 | * | 1/2002 | Haun ......................... 501/155 |

FOREIGN PATENT DOCUMENTS

| | | |
|---|---|---|
| JP | 01278443 | 11/1989 |
| SU | 336297 | 12/1967 |

OTHER PUBLICATIONS

PCT Search Report PCT/IN 02/00067 dated Jun. 12, 2002.

* cited by examiner

*Primary Examiner*—Christopher A. Fiorilla
(74) *Attorney, Agent, or Firm*—Morgan & Finnegan, LLP

(57) ABSTRACT

The present invention is directed to an improved process for the production of ceramic tiles using industrial wastes. The invention particularly relates to an improved process for the production of ceramic tiles using industrial wastes such as iron ore slime, fly ash and blast furnace slag.

14 Claims, No Drawings

PROCESS FOR THE PRODUCTION OF CERAMIC TILES

FIELD OF THE INVENTION

The invention relates to an improved process for the production of ceramic tiles using industrial wastes. The invention particularly relates to an improved process for the production of ceramic tiles using industrial wastes such as iron ore slime, fly ash and blast furnace slag.

The products produced by the process of present invention may be of different shapes and sizes, in the glazed or unglazed forms as per requirement. The near impervious unglazed tiles shall be useful for laying floor of industries, storage depots, buildings etc. where the floors are subjected to scratch and abrasion. The glazed tiles with matte finish shall be useful for making decorative floors while the glazed tiles with glossy finish shall be useful for making decorative walls of buildings.

BACKGROUND OF THE INVENTION

Hitherto known processes use costly minerals such as kaolin, feldspar, quartz, talc, pyrophyllite etc. to produce ceramic tiles. The existing processes to produce ceramic tiles, consisted of wet mixing of raw materials, spray drying, compaction, drying, glazing and firing. The raw materials are wet mixed in mills. The wet slurry obtained is filter pressed to squeeze the water out and then spray dried to get very small nodules of raw material for better compaction. The ready powder is compacted in tile shape by hydraulic pressing then dried and fired to get unglazed tiles. To get the glazed tiles first engob is applied to hide the body colour then glaze is applied on the surface of unbaked tiles and then fired. The existing process also require double firing for high quality glossy glazing of tiles for walls. Another known process use iron ore tailings in combination with other minerals like kaolin, feldspar, quartz, talc etc. to produce ceramic tiles. The raw materials are wet mixed in mills, filter pressed to squeeze the water out and then spray dried to get small nodules of raw material for better compaction. The ready powder is compacted in tile shape by hydraulic pressing then dried and fired to get unglazed tiles. To get the glazed tiles first engob then glaze is applied on the surface of unbaked tiles and then fired.

U.S. Pat. No. 5,830,251 discloses the manufacture of ceramic tiles by first melting material to form glass, followed by grinding the glass with additives and compacting it to the shape required and devitrifying it to form the final ceramic tiles.

U.S. Pat. No. 5,558,690 discloses a process wherein spent aluminium potliner containing carbonaceous material, fluorine and glass forming materials are oxidized to combust the carbonaceous materials and partially volatilize the fluorine in the glass forming materials. The oxidized glass forming materials are then vitrified to form a glass melt which is then formed into fluorine containing tiles.

U.S. Pat. No. 5,935,885 discloses a process wherein fly ash containing organic material, metal contaminants, and glass forming materials is oxidized under conditions sufficient to combust the organic material and partially oxidize the metal contaminants and the glass forming materials. The oxidized glass forming materials are then vitrified to form a glass melt, which is then formed into the final tiles containing metallic contaminants.

The above processes suffer from several disadvantages:
1. Waste materials first need to melted thereby significantly increasing energy consumption.
2. The further grinding of the glass formed also requires high energy consumption.

Floors made of products of known processes are not capable of withstanding scratch and high abrasion required in a number of industrial applications as they have relatively low scratch hardness (around 5 in Molt's Scale) and compressive strength. The production cost of the sintered tiles made from the costly minerals is relatively high The raw materials used for production of existing ceramic floor and wall tiles require long time for grinding to achieve fineness since they are formed in lumps, leading to the consumption of more energy.

OBJECTS OF THE INVENTION

The main object of the present invention is to provide an improved process to produce ceramic tiles in glazed and unglazed form using industrial wastes such as iron ore slime, fly ash, blast furnace slag and other low cost minerals.

Another object of the present invention is to provide an improved process to produce unglazed and glazed ceramic tiles using industrial wastes such as iron ore slime, fly ash, blast furnace slag and other low cost minerals whereby the cost of production is appreciably lowered and the properties of the product is improved.

Yet another object of the present invention is to provide an improved process to produce glazed and unglazed tiles using industrial wastes such as iron ore slime fly ash and blast furnace slag whereby the energy consumption is significantly reduced.

Still yet another object of the present invention is to provide an improved process to produce glazed and unglazed tiles using iron ore slime, fly ash and blast furnace slag which are waste materials and thereby reducing the pollution in the environment.

SUMMARY OF THE INVENTION

According to literature survey and available information, at present no process is available to produce ceramic tiles from iron ore slime, fly ash and blast furnace slag, which is energy intensive. The purpose of this development is to use abundantly available waste materials such as iron ore slime, fly ash and blast furnace slag which cause environmental pollution, as raw material to produce value added products such as ceramic tiles.

Accordingly, the present invention provides an improved process for the production of ceramic tiles using industrial wastes which comprises:

(a) intimately mixing iron ore slime in the range of 30 to 50% by weight, fly ash 10 to 25% by weight, blast furnace slag 5 to 20% by weight, aluminosilicate minerals 25 to 50% by weight, additives 5 to 15% by weight, the balance comprising water, for a period in the range of 6 to 10 hours, (b) drying the wet mixed raw materials, (c) granulating the dried powder using an organic liquid binder, (d) compacting the granulated powder to form tiles of the desired size, (e) drying the compacted tiles slowly at a temperature in range of 90 to 120° C. for a period in the range of 10 to 15 hours.

In one embodiment of the invention, the iron ore slime, fly ash, blast furnace slag and alumino silicate minerals are selected from the following composition range:

| Constituent (wt %) | Iron ore slime | Fly ash | Blast furnace slag | Aluminosilicate minerals |
|---|---|---|---|---|
| $SiO_2$ | 1–20 | 45–65 | 25–45 | 40–65 |
| $Al_2O_3$ | 1–10 | 15–30 | 15–30 | 15–20 |
| $Fe_2O_3$ | 75–95 | 3–6 | 0.01–2 | 1–5 |
| CaO | Trace | 1–4 | 25–40 | 2–5 |
| MgO | Trace | 0.01–2 | 5–15 | Trace |
| $TiO_2$ | 0.01–2 | 1–3 | 1–2 | 0.01–2 |
| L.O.I. | 1–5 | 1–8 | 1–3 | 8–15 |

In one embodiment of the invention, the compacted tiles as obtained are fired at a temperature in the range of 1100 to 1300° C. for a period in the range of 30 to 60 minutes to obtain unglazed tiles.

In another embodiment of the invention, unglazed tiles are cooled slowly after firing. In another embodiment of the invention, engob is applied to the dried compacted tiles and the tiles thereafter glazed to obtain glazed tiles.

In a further embodiment of the invention, engob is applied by spraying onto compacted tiles.

In a further embodiment of the invention, the glazed tiles are fired at a temperature in the range of 1050 to 1150° C. for a period in the range of 15 to 30 minutes.

In another embodiment of the invention, glazed tiles are cooled slowly after firing.

In a further embodiment of the invention, the aluminosilicate mineral is selected from the group consisting of kaolin, bentonite, illite and pyrophillite.

In another embodiment of the invention, the additives are selected from the group consisting of talc, soapstone, feldspar and any mixture thereof.

In yet another embodiment of the invention, the organic binder is selected from the group consisting of polyvinyl alcohol, methyl cellulose, carbomethoxy cellulose and dextrin. In a further embodiment of the invention, the binder is used in an amount in the range of 4–8% by weight.

In still another embodiment of the invention, the compaction pressure for the tile is in the range of 250–300 kg/cm2.

In another embodiment of the invention, drying of compacted tiles is done in a temperature range of 90–120° C. to obtain moisture content of less than 0.5% in dried tiles.

DETAILED DESCRIPTION OF THE INVENTION

In the process of present invention, liquid phase sintering of iron ore slime, fly ash and blast furnace slag takes place in the presence of aluminosilicate minerals. Additive is added during raw material mixing to promote the reaction sintering at lower temperature (1150 to 1250° C.). The iron ore slime, used in the present invention contain iron oxides, and silica, the fly ash used in the present invention contains silica, alumino and iron oxide, the blast furnace slag used in the present invention contains calcium oxide, silica, alumina and magnesium oxide.

Silica is the most important constituent for any ceramic tile composition to form crystalline as well as glassy phase. The three waste materials used in the present invention contain silica along with alumina, iron oxide and calcium oxide and magnesium oxide. These constituents react together during heating and form mullite, fayalite, anorthite and other crystalline phase on reaction sintering. The crystalline phase is uniformly distributed and reinforced in glassy matrix. As a result, a strong, dense and compact microstructure is achieved which contribute to the high scratch hardness and strength. The thermal expansion of the present tile body is kept equal or marginally higher then thermal expansion of the glaze, so that glaze materials remains under compression to the body to avoid microcracking and chipping of the glaze.

Tiles produced by the present invention have the following range of properties:

| | |
|---|---|
| Dimension stability | Within 0.5% variation. |
| Surface quality | 95% free from visible defects. |
| Percent water absorption | 2–5% for floor and 14–16% for wall |
| Scratch hardness | 6–7 (Moh's scale) |
| Modulus of rupture | 250 kg/cm$^2$ |
| Compression strength | 350 to 500 kg/cm$_2$ |

The following examples are given by way of illustration and should not be construed to limit the scope of invention.

EXAMPLE 1

300 gins of iron ore slime, 250 gins of fly ash, 80 gins of blast furnace slag, 300 gins of aluminosilicate minerals and 70 gins of additives were uniformly mixed with 750 cc of water in a pot mill for a duration of 10 hours. Slurry was dried in an electric oven at 105° C. 60 cc of polyvinyl alcohol was sprayed on dried powder uniformly. Marketable size tiles of 112×112×7 mm dimensions were produced by compaction at 260 kg/cm2 pressure.

The tiles were then oven dried at 110° C. for 14 hours. Finally unglazed tiles were obtained by sintering product at 1240° C. for 45 minutes. The properties obtained are given in Table-1 below.

EXAMPLE 2

370 gins of iron ore slime, 200 gins of fly ash, 120 gins of blast furnace slag, 250 gins of aluminosilicate minerals and 60 gins of additives were uniformly mixed with 850 cc of water in a pot mill for 9 hours. Dewatering of slurry was done by drying in an oven at 110° C. 50 cc of carboxymethyl cellulose was sprayed on the powder thoroughly. Square shape tiles of 112×112×8 mm dimension were compacted at 300 kg/cm2 pressure.

The tiles were then dried in oven at 110° C. for 15 hours. Finally the vitrified unglazed tiles were obtained by sintering the product at 1225° C. for 1 hour. The properties are given in Table-1.

EXAMPLE 3

320 gins of iron ore slime, 150 gins of fly ash, 150 gins of blast furnace slag, 300 gins of aluminosilicate mineral and 80 gins of additives were thoroughly mixed with 800 cc of water in a pot mill for 8 hours. Dewatering of slurry was done by drying in an oven at 110° C. 55 cc of polyvinyl alcohol was sprayed uniformly on the powder. 112×112×6 mm size tiles were produced by compaction at 250 kg/cm2.

Tiles were then dried at 110° C. for 15 hours. First engob, then glaze were sprayed on the surface of the tiles uniformly. Finally firing was done at 1150° C. for a period of 30' minutes to get glaze tiles. The properties obtained are given in Table-1.

EXAMPLE 4

400 gms of iron ore slime, 150 gms of fly ash, 100 gms of blast furnace slag, 250 gms of alumino silicate mineral and 100 gms of additives were wet mixed in a pot mill for 10 hours using 750 cc of water. Dewatering of slurry was done by drying in an oven at 110° C. Then 60 cc of polyvinyl alcohol was sprayed on the dried powder uniformly. Market size tiles of 112×112×7 mm dimensions were produced by compacting at 280 kg/cm2 pressure. The tiles were then oven dried at 110° C. for 15 hours. Engob and glaze was sprayed on the surface of the tiles uniformly. Finally sintering was done at 1100° C. for 30 minutes to get the glazed tiles. The properties obtained are given in Table-1.

TABLE 1

Properties of various tiles.

| Properties | Example 1 | Example 2 | Example 3 | Example 4 |
|---|---|---|---|---|
| Dimension stability | within 0.5% variation | within 0.5% variation | within 0.5% variation | within 0.5% variation |
| Surface quality | 95% free from visible defects | 95% free from visible defects | 95% free from visible defects | 95% free from visible defects |
| % water absorption | 2.5 | 4.3 | 15.4 | 15.00 |
| Scratch hardness (Moh's scale) | 7 | 7 | 6 | 6 |
| Modulus rupture (kg/cm2) | 400 | 360 | 255 | 270 |
| Compression strength (kg/cm2) | 450 | 430 | 350 | 365 |

The main advantages of the present invention are:
  a) The invention utilizes abundantly available industrial wastes as major raw materials to produce tiles, thereby reducing the cost of production in comparison to the known process, and reducing pollution.
  b) The invention saves energy in terms of grinding time of raw materials.
  c) The products of the present invention are superior in terms of scratch hardness, Modulus of rupture and compressive strength then products produced by existing process.

What is claimed is:

1. A process for the production of ceramic tiles using industrial wastes which comprises:
  (a) intimately mixing iron ore slime in the range of 30 to 50% by weight, fly ash 10 to 25% by weight, blast furnace slag 5 to 20% by weight, aluminosilicate minerals 25 to 50% by weight, additives 5 to 15% by weight, the balance comprising water, for a period in the range of 6 to 10 hours,
  (b) drying the wet mixed raw materials in step 1(a) into a dry powder,
  (c) granulating the dried powder using an organic liquid binder,
  (d) compacting the granulated powder to form tiles of the desired size,
  (e) drying the compacted tiles slowly at a temperature in range of 90 to 120° C. for a period in the range of 10 to 15 hours.

2. A process as claimed in claim 1 wherein the iron ore slime, fly ash, blast furnace slag and alumino silicate minerals are selected from the following composition range:

| Constituent (wt %) | Iron ore slime | Fly ash | Blast furnace slag | Aluminosilicate minerals |
|---|---|---|---|---|
| SiO$_2$ | 1–20 | 45–65 | 25–45 | 40–65 |
| Al$_2$O$_3$ | 1–10 | 15–30 | 15–30 | 15–20 |
| Fe$_2$O$_3$ | 75–95 | 3–6 | 0.01–2 | 1–5 |
| CaO | Trace | 1–4 | 25–40 | 2–5 |
| MgO | Trace | 0.01–2 | 5–15 | Trace |
| TiO$_2$ | 0.01–2 | 1–3 | 1–2 | 0.01–2 |
| L.O.I. | 1–5 | 1–8 | 1–3 | 8–15. |

3. A process as claimed in claim 1 wherein the compacted tiles as obtained are fired at a temperature in the range of 1100 to 1300° C. for a period in the range of 30 to 60 minutes to obtain unglazed tiles.

4. A process as claimed in claim 3 wherein the unglazed tiles are cooled slowly after firing.

5. A process as claimed in claim 1 wherein engob is applied to the dried compacted tiles and the tiles thereafter glazed to obtain glazed tiles.

6. A process as claimed in claim 5 wherein the engob is applied by spraying onto the compacted tiles.

7. A process as claimed in claim 5 wherein the glazed tiles are fired at a temperature in the range of 1050 to 1150° C. for a period in the range of 15 to 30 minutes.

8. A process as claimed in claim 5 wherein the glazed tiles are cooled slowly after firing.

9. A process as claimed in claim 1 wherein the aluminosilicate mineral is selected from the group consisting of kaolin, bentonite, illite and pyrophillite.

10. A process as claimed in claim 1 wherein the additives are selected from the group consisting of talc, soapstone, feldspar and any mixture thereof.

11. A process as claimed in claim 1 wherein the organic binder is selected from the group consisting of polyvinyl alcohol, methyl cellulose, carbomethoxy cellulose and dextrin.

12. A process as claimed in claim 1 wherein the binder is used in an amount in the range of 4–8% by weight.

13. A process as claimed in claim 1 wherein the compaction pressure for the tiles is in the range of 250–300 kg/cm2.

14. A process as claimed in claim 1 wherein drying of compacted tiles is done in temperature range of 90–120° C. to obtain moisture content of less than 0.5% in dried tiles.

* * * * *